Figure 1:
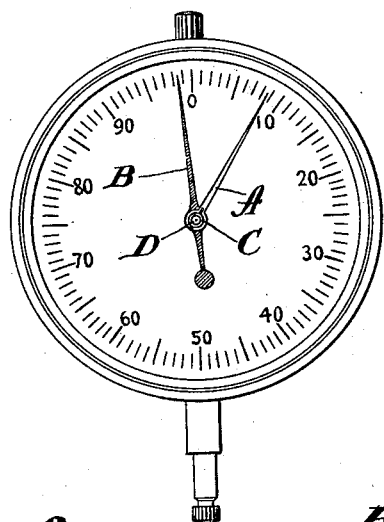

Nov. 5, 1929.  A. F. SHORE  1,734,183
REGISTERING MECHANISM
Filed June 30, 1927

INVENTOR.
Albert F. Shore
BY
his ATTORNEY.

Patented Nov. 5, 1929

1,734,183

UNITED STATES PATENT OFFICE

ALBERT F. SHORE, OF NEW YORK, N. Y.

REGISTERING MECHANISM

Application filed June 30, 1927. Serial No. 202,500.

This invention relates to improvements in registering mechanism for use particularly with apparatus for measuring the hardness of materials, such, for instance, as covered by my co-pending application, Ser. No. 20,599, filed April 4, 1925, and my co-pending application, Ser. No. 182,243, filed April 9, 1927.

It will be seen upon an examination of the drawings constituting part of the said applications that there is used but a single indicator-hand for each gage, to wit: for the gage which indicates the amount of pressure applied to the indentor-point, and for the gage which indicates the depth of penetration of the said indentor-point. However, with the view of obtaining accuracy, it is necessary at the inception of each testing operation, for ascertaining degree of hardness, depth of penetration, etc., to first return or reset the indicator-hand at zero in both the pressure-gage and the depth-gage of said applications. This is, of course, a simple operation, but takes time and requires care.

The principal object of this present invention is to provide two or more indicator-hands or pointers, constituting a unitary structure, consisting of a main member and an auxiliary member or members. All of these members may be fastened rigidly to a single ferrule or hub located in the center of the dial shown in Fig. 1 of the drawing, or they may be made of a single punching, as when conducting standard hardness tests. In this event, prior to the beginning of a test, the indicator-hands as a whole, to wit: a unitary structure, may be first returned, as far as the main member is concerned, approximately to zero on the scale, but whether this is done or not, so long as the said main member is somewhere near zero on the scale, the operative may proceed with the test.

It is to be understood that the simple dial shown in Fig. 1 of the drawing accompanying and forming a part of this application is submitted merely as an illustration of one embodiment of my invention, and that the auxiliary member and the main member may be rigidly fastened on a single ferrule or hub, instead of having just a flat strip of stock split, it, of course, being understood that any convenient or suitable manner of fastening the said members together may be used or employed. In this arrangement, the operation depends more or less not only on the persistence of vision, but also on the persistence of what may be termed as temporary or short-period memory. By the use of this twin pointer indicator-hand arrangement, it is unnecessary to set the main member exactly at zero at the beginning of the testing operation; it will suffice to set the main hand approximately at zero; in fact, it will suffice to set the said member on any other part of the scale of the dial, although, of course, it is much more convenient and practical to set this main member at the top of the scale to facilitate reading prior to each testing operation or at the termination of each testing operation, so that the apparatus, including the main member on the scale, will be in normal position, ready for use at any moment when it is desired to make a hardness test. In this embodiment of my invention, when it is desired to ascertain and register on the scale a pre-determined depth of penetration, or constant depth of penetration, the operative will first space off the auxiliary-hand from the main hand the necessary number of divisions on the scale of the dial to represent the desired predetermined depth of penetration, the eye of the operative is then focused on that part of the micrometer scale where the auxiliary indicator-hand is located, and continues to remain so focused until pressure is applied and the hands move forward as a unit on the scale until the main hand registers at that point on the scale formerly occupied by the auxiliary hand, when the pressure is shut off or discontinued by the operative and the testing operation ended. This operation may be repeated an indefinite number of times and in this way, one will be able to ascertain quickly and accurately the data covering the test or series of tests on a particular metal or various kinds of metals or materials, regardless of their hardness, softness, or other qualities, etc.

In the drawing accompanying and forming a part of this application, in Fig. 1 there is shown a front elevation of a standard micrometer-measuring dial gage-head, and which illustrates the preferred embodiment of the application of my new unitary indicator-hand thereto. It will be observed that in this figure the main member is shaded and the auxiliary member is in simple cut lines. It will also be noted that, for the purpose of illustration merely, the indicator members have been set approximately with the main member near zero and the auxiliary member near and before the 10 degree indication on the scale.

Figure 2:
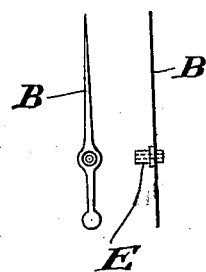
Figure 3:
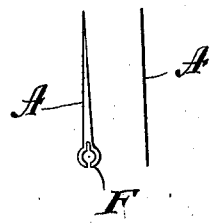

Fig. 2 is a detail of the main member or indicator-hand and Fig. 3 is a detail of the auxiliary member or indicator-hand of my new and improved registering mechanism constituting the subject matter of this application.

It is understood that the auxiliary member A may be fastened or mounted on the same hub or ferrule C frictionally so as to permit manual adjustment thereof to any predetermined position, relative to the main member B, by means of a split eye D, instead of having just a flat strip of stock, it, of course, being understood that any other convenient or suitable manner of fastening the main member and the auxiliary member together, to form a single apparently unitary device, may be employed, or they may be stamped out from a strip as a single piece.

The operation is as follows:

On a slight prolongation of the hub or ferrule C of the main pointer-hand B which is adapted to fit on the spindle E of the micrometer gage, the split-eye end F of the auxiliary hand is pushed on down to the flange or stop, near the main hand. The split eye will not only hold the auxiliary hand in any predetermined position but it may be revolved and adjusted relative to the main hand to any radial position on the dial. It is understood that even though the auxiliary hand may be spaced off for any desired number of divisions on the dial, the main hand may be set to zero if convenient, and the auxiliary hand disregarded, or a third single hand may be used instead of the counter-balancer arm on opposite side of the spindle, particularly when odd depths or divisions on the dial are to be registered or measured. In routine testing, however, when it is not feasible to set the main hand to zero previous to each operation, the auxiliary hand is relied on, and if thus, it is set to a predetermined position on the dial, let us say ten divisions, it is merely necessary to fix the eye on any odd position that the auxiliary hand may be in then to operate the gage so that the main hand will quickly move to that position while the said auxiliary hand of course has moved away, inasmuch as it is locked or fixed on to the said main hand.

Due to the persistence of vision and temporary memory impressions, this method of reading constant depth values becomes feasible and a great convenience.

It is, of course, also understood that various changes may be made in the construction and operation of my invention, without departing from the spirit thereof, and it is further understood that the reason for not showing the gear-train in Fig. 1 of the drawing, together with its connections with the indentor-bar, etc., forming part of the apparatus covered by my co-pending applications first above mentioned, is that it is believed to be unnecessary.

I claim:

1. A main pointer-hand for a micrometer dial gage, said hand having a prolonged ferrule, and an auxiliary pointer-hand provided with an eye-end adapted to fit tightly on to said ferrule, said eye-end being split to permit of easy application and locking for all ordinary purposes of operation and adjustment to any desired position relative to the radial position of the main hand.

2. The combination of a micrometer dial gage having a spindle provided with a ferrule, twin spacing hands arranged on one side of the ferrule of the spindle and a single hand on the opposite side of the said twin hands, all three being adjustable and in position on the said ferrule of the same spindle at any desired distance relative to each other, prior to the making of a hardness test and remaining fixed in said position during the making of the test.

3. In a graduated dial-gage having a scale, a plurality of adjustable indicating hands adapted to be adjusted on said scale at predetermined positions relative to each other previous to a testing operation to indicate a predetermined depth of indentation, said hands remaining fixed and constituting a single unit during the testing operation, and means for manually adjusting the respective positions of said indicating hands prior to a test, to indicate different depths of indentation, as required for special hardness tests.

In testimony whereof, I affix my signature.

ALBERT F. SHORE.